(12) United States Patent
Yamaguchi et al.

(10) Patent No.: US 7,557,885 B2
(45) Date of Patent: Jul. 7, 2009

(54) DISPLAY AND DISPLAY SYSTEM FOR MEDICAL USE

(75) Inventors: Akira Yamaguchi, Kanagawa (JP); Kazuhiro Nakamura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 937 days.

(21) Appl. No.: 10/773,211

(22) Filed: Feb. 9, 2004

(65) Prior Publication Data
US 2004/0183975 A1   Sep. 23, 2004

(30) Foreign Application Priority Data

| Feb. 7, 2003 | (JP) | ............................. 2003-031167 |
| Apr. 28, 2003 | (JP) | ............................. 2003-123549 |

(51) Int. Cl.
*G02F 1/1335* (2006.01)
(52) U.S. Cl. ...................................... 349/137
(58) Field of Classification Search ................. 349/137
See application file for complete search history.

(56) References Cited

U.S. PATENT DOCUMENTS

| 5,847,795 | A | * | 12/1998 | Satoh et al. ................. 349/137 |
| 6,383,559 | B1 | | 5/2002 | Nakamura et al. |
| 6,778,240 | B2 | | 8/2004 | Nakamura et al. |
| 6,818,263 | B2 | * | 11/2004 | Shimodaira et al. .......... 428/1.6 |
| 7,110,011 | B2 | | 9/2006 | Yamaguchi et al. |
| 7,206,005 | B2 | * | 4/2007 | Yamashita et al. .......... 345/695 |
| 2001/0035929 | A1 | * | 11/2001 | Nakamura et al. .......... 349/137 |
| 2002/0039084 | A1 | | 4/2002 | Yamaguchi |
| 2002/0085284 | A1 | * | 7/2002 | Nakamura et al. .......... 359/601 |

FOREIGN PATENT DOCUMENTS

| JP | 10104402 A | 4/1998 |
| JP | 11-6902 A | 1/1999 |
| JP | 200020038 A | 1/2000 |
| JP | 2000-275404 A | 10/2000 |
| JP | 2000347208 A | 12/2000 |
| JP | 2001258054 A | 9/2001 |
| JP | 2001343503 A | 12/2001 |
| JP | 2002102176 A | 4/2002 |
| JP | 2002182005 A | 6/2002 |
| JP | 2002350825 A | 12/2002 |
| JP | 2003029036 A | 1/2003 |

* cited by examiner

*Primary Examiner*—Michael H Caley
(74) *Attorney, Agent, or Firm*—Sughrue Mion, PLLC

(57) ABSTRACT

The medical display includes a display device of a matrix type having a resolution of 100 to 300 ppi to display a medical image and at least one anti-reflection layer on a side of a front surface of said display device. The medical display system includes the medical display and a luminance meter measuring luminance. The anti-reflection layer has an average specular reflectivity of 0.5% or less at an incident angle of 5° in a wavelength range of 450 to 650 nm, receives light from a CIE standard light source D65 at an incident angle of 5° in a wavelength range of 380 to 780 nm to reflect the light as regular reflection light whose color falls within a range of $-7 \leqq a^* \leqq 7$ and $-10 \leqq b^* \leqq 10$ in terms of a* and b* values of CIE 1976 L*a*b* color space, and is placed on a surface whose flatness is defined by an arithmetic average height Ra and a maximum height Rz according to JIS B 0601-2001, with Ra set at 0.02 μm or less and Rz set at 0.04 μm or less.

13 Claims, 5 Drawing Sheets

DISPLAY AND DISPLAY SYSTEM FOR MEDICAL USE

BACKGROUND OF THE INVENTION

1. Field of the Invention

The present invention relates to a medical display and a medical display system using the display. In particular, the present invention relates to a medical display provided with an anti-reflection film which is flat or has a given degree of flatness, in other words, which does not have an anti-glare property, and a medical display system for displaying an image on the medical display.

2. Description of the Related Art

A diagnostic image taken and processed by a medical measurement (image pickup) apparatus such as an MRI, a CT scanner, a DSA apparatus, an FCR (Fuji computed radiography) or other CR apparatus, a mammography apparatus, or a digital X-ray radiography (DR) apparatus, is usually recorded on a light-transmissive image recording film such as an X-ray film or a photosensitive film, and reproduced as a light-transmissive image. The film on which the diagnostic image is reproduced is set in a light source apparatus called a film viewer and is illuminated from the back. The backlit diagnostic image on the film is observed as a transmission image for diagnosis.

An alternative has become available in recent years and a diagnostic image taken by a medical measurement apparatus can now be displayed for diagnosis on various image display devices (electronic film viewer) such as a liquid crystal display device (LCD), a plasma display panel (PDP), an electroluminescence display (ELD, in particular, organic ELD), or a CRT (cathode ray tube) display device.

In an image display device (display) as given above, its display screen has an anti-glare (AG) property in order to avoid surface reflection on the display screen and to prevent an image displayed on the screen from glaring for improved visibility of the display screen. The AG property is obtained by making the front or rear surface of the material of the display screen, for example, a glass substrate or a polarization plate, irregular and then matting the front and rear surfaces of the substrate or the polarization plate through application of an application solution that contains matte particles. Alternatively, the AG property is acquired by forming transparent films on the front and rear surfaces of a substrate or a polarization plate and making the surfaces of the transparent films irregular through embossing or other method (See JP 2000-275404 A).

Giving the AG property to a display screen (polarization plate) of the display is effective against reflection light of an observer or an external object on the display screen.

On the other hand, the vividness and sharpness of an image displayed are degraded because of the AG property, resulting in a blurred image. Also, glaring becomes conspicuous in medical displays of 100 to 300 ppi (pixel per inch), in particular, LCDs having a 200 ppi or higher resolution matrix structure for interpretation of a mammographic image in which minute calcification or the like has to be interpreted. If the medical display in question is a monochrome display, image disturbances are particularly noticeable, and an image is shifted in the front-to-back direction due to the AG property, thus giving a 'double vision' look to the image. The image disturbances cause an eye strain and present difficulties in interpreting the image.

In addition, the AG property makes the display screen reflect light from the surroundings at an increased diffuse reflectance. The screen therefore assumes a whitish appearance, causing dark areas of a displayed image to look protruded and lowering contrast. A medical image generally has a wide dynamic range of shades, so that lowering of contrast presents a great deterrent in making a diagnosis.

A transmission image on a film to be interpreted for diagnosis by a conventional film viewer shows a slight difference depending on the luminance of the film viewer used and observation environments, but is basically the same. In contrast, an image displayed on a display fluctuates when displayed on a different type of display, or when the display undergoes a change in state or a change with time, or when there are other factors. The fluctuation could cause a false diagnosis. Therefore, in making a diagnosis from interpretation of an image displayed on a display, the display has to be kept in a given state to keep the displayed image in a given, proper state. However, even when the state of a displayed image is kept constant, the appearance of the displayed image is varied depending on observation environments.

For that reason, DICOM (Digital Imaging and Communication in Medicine, a standard for transmission of medical image data, waveform data, and the like) prescribes that a diagnostic image can be displayed on a display only after performing gradation correction using GSDF (Grayscale Standard Display Function). The standard also prescribes that gradation correction should be performed by taking into account not only the luminance of the display but also observation environments including the luminance of peripheral light. However, gradation correction in consideration of the luminance of peripheral light narrows the dynamic range of a medical image displayed when the contrast is lowered, and this works against the fact that a wide dynamic range of shades is required in a medical image.

On the other hand, when a display screen (polarization plate) of a display does not have the AG property (when the display screen is untreated), the display screen is large in specular reflectivity (about 4%) and therefore has less ability to avoid reflection of light of a viewer or an external object on the screen while an image obtained resembles a transmission image on a film which is vivid and sharp and which has no glare. In a medical monochrome LCD for interpreting subtle shades, to obtain an image resembling a transmission image on a film which is vivid and sharp and which has no glare takes precedence and therefore the display screen of the display is stripped of AG property. Reflection of light of a viewer or an external object on a display screen can be reduced by shutting out peripheral light, but this is not enough to completely eliminate reflection on the display screen because light of the display screen itself is reflected by the viewer of the display screen. In clinical environment, in particular, viewers usually wear lab coats and that much more likely to cause reflection on the screen.

This problem could be solved by giving a display screen of a display an anti-reflection (AR) property.

An anti-reflection (AR) film that has conventionally been used to impart the AR property is a multilayer film having layers of transparent thin films of metal oxides. Plural transparent thin films are used in order to prevent reflection of light in as wide a wavelength range as possible within the visible light range. Such transparent thin films of metal oxides are formed by evaporation, for example, chemical vapor deposition (CVD) and physical vapor deposition (PVD). Vacuum evaporation or sputtering which is one of physical vapor deposition methods is particularly employed to form those films. In the evaporation methods, an AR film obtained is low in specular reflectivity (0.5% or less) and therefore has an excellent ability to avoid reflection of light of a viewer or the surroundings on the display screen. However, the cost is high, and the original color of the displayed image is impaired by coloring due to the AR film, which is a serious problem. To elaborate, an AR film formed by one of those evaporation methods to have an average reflectivity of 0.5% or less, in particular, 0.4% or less, in a wavelength range of 450 nm to 650 nm is excellent in avoiding reflection on the display screen while the film has a poor reflection characteristic on the long wavelength side and the short wavelength side (especially the short wavelength side), resulting in poor color neutrality. Because of the poor color neutrality, light reflected by the AR film is heavily colored in reddish purple to bluish purple, and thus the. display quality is degraded. One more problem in employing evaporation or sputtering is that the manufacture method produces AR films in batches and therefore is low in productivity while being high in cost.

Application is another conventional way to obtain the AR property, and an AR film can be created by applying inorganic particles or polymers once or more to form a single layer or multiple layers. Application is a low-cost method because a large continuous area of a film can be formed by roll-to-roll. However, an AR film manufactured by application is about 1 to 2% in specular reflectivity and the average reflectivity exceeds 1%, which presents a serious problem of insufficient AR ability. Although some conventional application methods have been successful in obtaining an average reflectivity of 0.5% or less, light reflected by an AR film that is formed by application is heavily colored in reddish purple when the color of the reflected light is calculated from the reflection spectrum or when a real sample of the AR film is observed visually. Accordingly, the display quality is degraded as is the case for an AR film formed by evaporation. In addition, since the reflected light is colored heavily, a slight fluctuation in thickness of the anti-reflection layer leads to a color shift great enough to be recognized visually (see JP 11-6902 A).

For that reason, the AR property is not given to a display screen of a medical display for interpreting subtle shades, in particular, a medical monochrome display.

SUMMARY OF THE INVENTION

The present invention has been made to solve the above-described problems of prior art, and an object of the present invention is to provide a medical display capable of displaying, without an anti-glare property, at low cost, a film-like, high-quality, diagnostic image which is free from reflection on the display screen and coloring by the use of a high performance anti-reflection (AR) film which has no anti-glare property and which is successful in achieving at the same time lowering of specular reflectivity and reduction in color tint.

Another object of the present invention is to provide a medical display system for enabling this medical display to stably display the diagnostic image.

In order to attain the objects described above, the first aspect of the present invention provides a medical display, comprising a display device of a matrix type having a resolution of 100 to 300 ppi to display a medical image, and at least one anti-reflection layer on a side of a front surface of the display device, wherein the anti-reflection layer has an average specular reflectivity of 0.5% or less at an incident angle of 5° in a wavelength range of 450 to 650 nm, the anti-reflection layer receives light from a CIE standard light source D65 at an incident angle of 5° in a wavelength range of 380 to 780 nm to reflect the light as regular reflection light whose color falls within a range of $-7 \leq a^* \leq 7$ and $-10 \leq b^* \leq 10$ in terms of $a^*$ and $b^*$ values of CIE 1976 L*a*b* color space, and the anti-reflection layer is placed on a surface whose flatness is defined by an arithmetic average height Ra and a maximum height Rz according to JIS B 0601-2001, with Ra set at 0.02 µm or less and Rz set at 0.04 µm or less.

Preferably, the anti-reflection layer in a form of an anti-reflection film is formed on a support.

And, preferably, the anti-reflection film is spread over the front surface of the display device.

Further, preferably, a protective panel is attached to the front surface of the display device in a manner that puts a distance between the protective panel and the front surface of the display device to avoid contact, and one of the anti-reflection film and the anti-reflection layer is placed on each side of the protective panel.

Preferably, the anti-reflection film has a transparent support having a refractive index of $n_B$, a hard coat layer having a refractive index of $n_H$ and being placed on the transparent support, and the anti-reflection layer being placed on the hard coat layer, wherein the anti-reflection layer practically has three sub-layers of different refractive indexes, with an intermediate refractive sub-layer being closest to the transparent support and having a refractive index of n1, a high refractive sub-layer following the intermediate refractive sub-layer and having a refractive index of n2, and a low refractive sub-layer being farthest to the transparent support and having a refractive index of n3, wherein the refractive indexes of the three sub-layers satisfy the following relations, $$n3 < n_B,\ n_H < n1 < n2$$

wherein, at a design wavelength λ (500 nm), the intermediate refractive sub-layer, the high refractive sub-layer, and the low refractive sub-layer satisfy the following expressions (I), (II), and (III), respectively.

$$\lambda/4 \times 0.80 < n1 \times d1 < \lambda/4 \times 1.00 \tag{I}$$

$$\lambda/2 \times 0.75 < n2 \times d2 < \lambda/2 \times 0.95 \tag{II}$$

$$\lambda/4 \times 0.95 < n3 \times d3 < \lambda/4 \times 1.05 \tag{III}$$

(where d1 represents a thickness (nm) of the intermediate refractive sub-layer, d2 represents a thickness (nm) of the high refractive sub-layer, and d3 represents a thickness (nm) of the low refractive sub-layer.)

Preferably, the anti-reflection layer is provided on the front surface of the display device.

And, preferably, the anti-reflection layer has such characteristics that the a* value and the b* value fulfill $0 \leq a^* \leq 5$ and $-7 \leq b^* \leq 0$, respectively, and that the average specular reflectivity is 0.3% or less at the incident angle of 5° in the wavelength range of 450 nm to 650 nm.

Preferably, a size of a display screen on the front surface of the display device is 18" to 23".

And, preferably, the display device is a monochrome display device.

And, preferably, a plane radiographic image obtained by CR (computed radiography) or using a flat panel sensor is displayed at a resolution of 100 to 180 ppi.

Further, preferably, a mammographic image obtained by CR (computed radiography) or using a flat panel sensor is displayed at a resolution of 180 to 300 ppi.

Moreover, in order to attain the objects described above, the second aspect of the present invention provides a medical display system, comprising a medical display displaying a medical image, and a luminance meter measuring luminance, wherein the medical display, comprising a display device of a matrix type having a resolution of 100 to 300 ppi; and at least one anti-reflection layer on a side of a front surface of the display device, wherein the anti-reflection layer has an average specular reflectivity of 0.5% or less at an incident angle of 5° in a wavelength range of 450 to 650 nm, the anti-reflection layer receives light from a CIE standard light source D65 at an incident angle of 5° in a wavelength range of 380 to 780 nm to reflect the light as regular reflection light whose color falls within a range of $-7 \leqq a^* \leqq 7$ and $-10 \leqq b^* \leqq 10$ in terms of $a^*$ and $b^*$ values of CIE 1976 $L^*a^*b^*$ color space, and the anti-reflection layer is placed on a surface whose flatness is defined by an arithmetic average height Ra and a maximum height Rz according to JIS B 0601-2001, with Ra set at 0.02 μm or less and Rz set at 0.04 μm or less, and wherein the medical display system has a function of measuring surface reflection luminance when a power is turned off and display luminance when the power is turned on with the luminance meter, a function of judging measurement data and displaying judgment results, a function of saving the measurement data and the judgment results, and a function of correcting gradation based on the measurement data.

Here, preferably, the luminance meter is connected online and has a function of measuring the luminance in sync with display of a luminance measurement test pattern on a display screen of the display device.

DETAILED DESCRIPTION OF THE PREFERRED EMBODIMENTS

A detailed description is given below on a medical display and a medical display system according to the present invention through preferred embodiments shown in the accompanying drawings.

The description below takes a liquid crystal display device as a typical medical display of the present invention, but the present invention is not limited thereto. A medical display of the present invention can be any matrix display, and the invention is applicable to various image display devices including plasma display panels (PDPs) and electroluminescence displays (ELDs, in particular, organic ELDs). The medical display of the present invention may be a monochrome display, a color display, or a color display that is capable of displaying a monochrome image.

Figure 1:
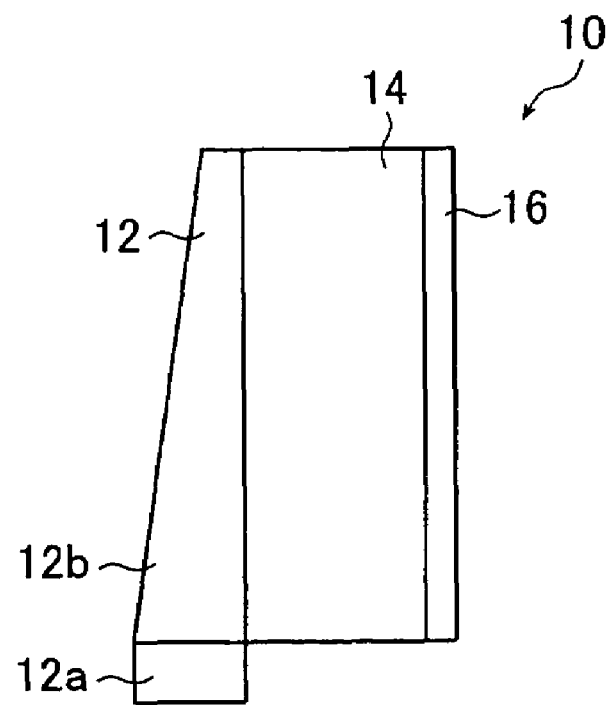
FIG. 1 is a schematic side view of a medical display according to an embodiment of the present invention.
Figure 2:
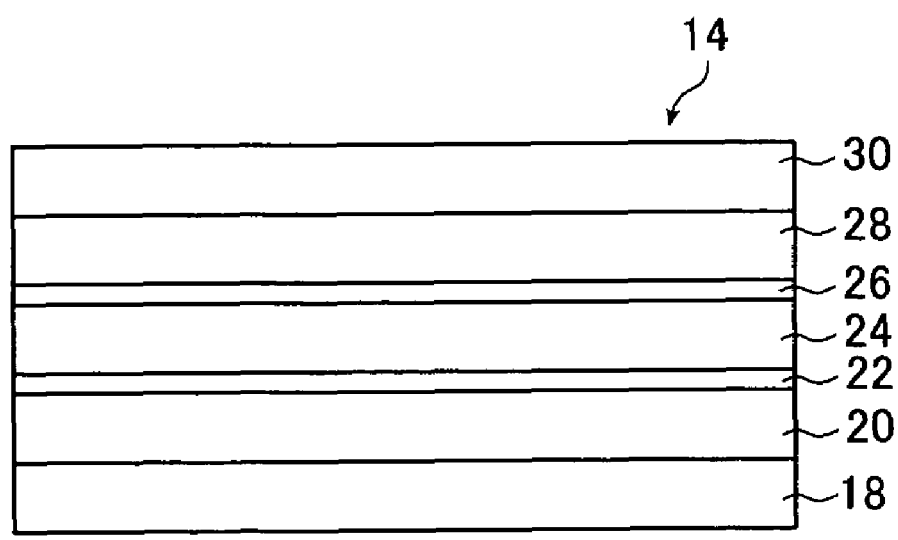
FIG. 2 is a schematic sectional view of a liquid crystal display unit of the medical display according to the embodiment shown in FIG. 1.
Figure 3:
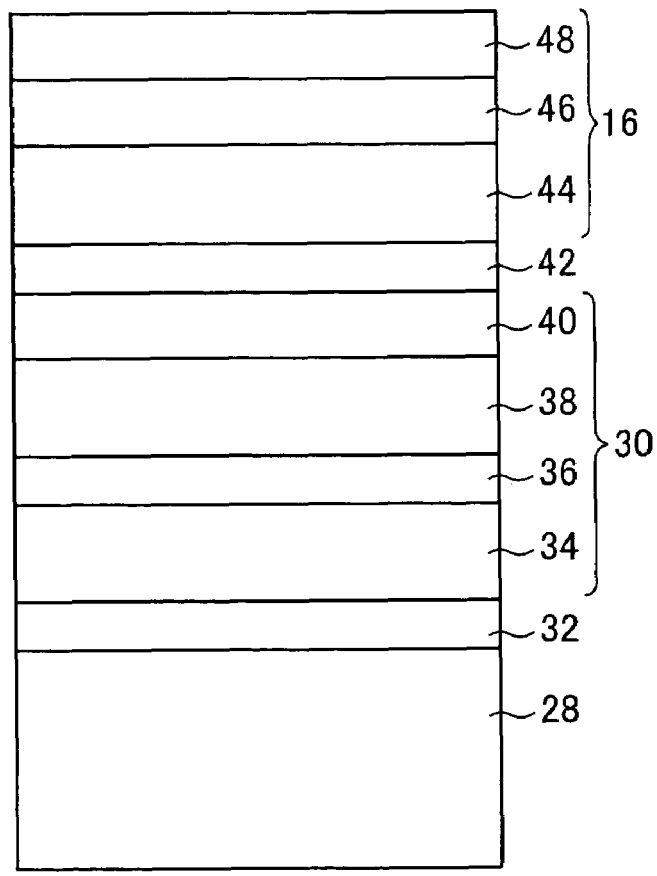
FIG. 3 is a schematic sectional view showing a layer structure of a main part of the medical display according to the embodiment shown in FIG. 1.

FIG. 1 shows a schematic side view of a medical display according to an embodiment of the present invention. FIG. 2 is a schematic sectional view of a liquid crystal display unit of the medical display according to the embodiment shown in FIG. 1. FIG. 3 is a schematic sectional view of a polarization plate in the liquid crystal display unit of FIG. 2 in the medical display according to the embodiment shown in FIG. 1.

A medical display 10 of FIG. 1 is a matrix display having a resolution of 100 to 300 ppi (pixel per inch) which receives image data of a medical image taken and processed by a medical measurement (image pickup and diagnostic) apparatus such as an MRI (diagnostic) apparatus, an NMR (diagnostic) apparatus, a CT (diagnostic) scanner, a DSA (diagnostic) apparatus, an FCR (Fuji computed radiography) or other CR (diagnostic) apparatus, a mammography (diagnostic) apparatus, or a digital X-ray radiography (DR) (diagnostic) apparatus and displays the medical image as a medical diagnostic image. Basically, the medical display 10 has a backlight unit 12, a liquid crystal display unit (hereinafter also abbreviated as an LCD unit) 14 and an anti-reflection (hereinafter also abbreviated as AR) film 16. In addition, the medical display (hereinafter simply referred to as display) 10 has a display controlling unit (not shown) for controlling display of an image on the LCD unit 14.

The backlight unit 12 serves as a light source of the display 10 to uniformly illuminate the entire LCD unit 14 from the back. The backlight unit 12 is a planar light source having approximately the same light exit plane (light generation plane) as a display screen of the LCD unit 14. The light source is composed of a lamp storing unit 12a and a backlight assembly 12b. The lamp storing unit 12a receives a rod-like lamp such as a cold cathode ray tube. The backlight assembly 12b has an optical waveguide (not shown) for guiding light emitted from the rod-like lamp in a given direction, a reflection sheet (not shown) for reflecting light that has been guided by the optical waveguide in a direction approximately at right angles with the given direction, and a diffusion sheet (not shown) or a prism sheet for uniformizing light that has been reflected by the reflection sheet.

The backlight unit 12 used in the present invention can be any planar light source as long as it uses the backlight assembly 12b that is composed of an optical waveguide, a reflection sheet, a diffusion sheet, a prism sheet, etc. to uniformly diffuse light generated by the cold cathode ray tube or the like in the lamp storing unit 12a. A known LCD backlight unit is employable as the backlight unit 12. The backlight unit 12 used in the present invention may be an LED array light source or a planar light source that uses an organic EL panel or an inorganic EL panel as long as it can emit light of required intensity.

The liquid crystal display unit (LCD unit) 14 is transmissive image display means for displaying a digitally recorded medical image as a diagnostic image, and receives image data of a diagnostic image taken and processed by the various medical measurement apparatuses as described above and displays the image. The LCD unit 14 may be a monochrome LCD, a color LCD, or a color LCD that is capable of displaying a monochrome image. The display 10 is desirably a display that displays a monochrome image from image data of a monochrome diagnostic image measured (taken) by a medical measurement apparatus that uses X-rays, such as a CR apparatus, a mammography apparatus or a DR apparatus, because the present invention can exert its effects best in that way. More desirably, the display 10 of the present invention is a display that displays a plane (simple) radiographic image or a mammographic image taken by a CR apparatus or a flat panel sensor.

FIG. 2 schematically shows a sectional view of the LCD unit 14 according to this embodiment.

As shown in FIG. 2, the LCD unit 14 is obtained by layering a polarization plate (a film-like polarization material or a polarization film) 18, a glass substrate 20, an electrode 22, a liquid crystal layer 24, an electrode 26, a glass substrate 28, and a polarization plate 30, starting from the side of the backlight unit 12 and proceeding toward the side of the AR film 16 (see FIG. 1). In short, the LCD unit 14 has the liquid crystal layer 24 sandwiched between the glass substrates 20 and 28 and the polarization plates 18 and 30 from both sides. The LCD unit 14, as well known, has a black matrix, RGB color filters, an orientation film, and others in addition to those components, although not shown in the drawing. If the LCD unit 14 is a TFT LCD, for example, the electrode 26 is a common electrode, and the black matrix and the RGB color filters are placed between the electrode 26 and the glass substrate 28 whereas the electrode 22 is composed of a display electrode, a gate electrode, and the like. The glass substrates 20 and 28 may be replaced by resin substrates or the like.

There is no particular limitation on the LCD unit 14 as long as it has a matrix structure and is capable of displaying a medical image at a resolution of 100 to 300 ppi. If this requirement is met, any LCD that has a known structure, known structural components and known liquid crystal display modes, and that is driven by a known driving method can be employed as the LCD unit 14. Examples of liquid crystal display modes of the LCD unit 14 include the TN mode, the STN mode, the CSH mode, the FLC mode, the OCB mode, and other liquid crystal display modes that use a polarization plate. A matrix driving method is employed to drive the LCD unit 14. Examples of an employable matrix driving method include a TFT active matrix driving method, a diode active matrix driving method, a passive matrix driving method using X-Y stripe electrodes, or the like.

The resolution of the LCD unit 14, which is an image display unit of the display 10 of the present invention, is limited to 100 to 300 ppi because, for a 18" to 23" screen size, which is suitable to display a plane radiographic image as a diagnostic image, a resolution less than 100 ppi is low, and the medical image displayed is pixelized and jagged, making it difficult to interpret minute lineation and calcification, whereas a resolution exceeding 300 ppi is high, and gate material options are limited for a transistor used to matrix-drive the LCD unit 14, making the transistor expensive. In addition, when the resolution is higher than 300 ppi, the aperture ratio is extremely small causing lack of luminance.

The LCD unit 14 of the display 10 of the present invention has to have a high definition matrix structure of 100 to 300 ppi (UXGA, QXGA, QSXGA, QUXGA, etc.). When a plane radiographic image taken by a CR apparatus or a flat panel sensor is to be displayed, the LCD unit 14 preferably has a resolution of 100 to 180 ppi. When an image to be displayed is a mammographic image which was taken by a CR apparatus or a flat panel sensor and which has minute calcification to be interpreted, the resolution of the LCD unit 14 is preferably 180 ppi to 300 ppi.

In the present invention, the display screen size of the LCD unit 14 is preferably 18" to 23" so that minute calcification and other changes can be detected with a high definition matrix structure of 100 to 300 ppi.

Given as a preferred example of an LCD monitor that has a resolution of 100 to 180 ppi is FC2090, a product of EIZO NANAO CORPORATION (panel size: 20.8", number of pixels: QXGA=2048×1536, pixel size: 207 μm=123 ppi, a monochrome IPS (In-Plane Switching) display with each pixel having sub-pixels). A preferred example of an LCD monitor that has a resolution of 180 to 300 ppi is MD22292, a product of International Display Technology Co., Ltd. (panel size: 22.2", number of pixels: QXGA-W=3840×2400, pixel size: 124.5 μm=204 ppi, a color IPS (In-Plane Switching) display with each pixel having RGB sub-pixels).

In the LCD unit 14 structured as above, light projected from the backlight unit 12 enters the polarization plate 18 and passes through the liquid crystal layer 24, where the light is formed into an image (positive image). The light then exits as transmission light from the polarization plate 30.

The polarization plate 30 constitutes the outermost layer of the LCD unit 14 where the AR film 16 is placed, in other words, the outermost layer from which transmission light exits. Usually, the polarization plate 30 is covered with a protective film, which is matted (roughened) on the front side or the rear side, preferably on the rear side, to obtain an anti-glare property. The polarization plate 30 in the present invention is preferably covered with a protective film having smooth front and rear surfaces that are not matted and that have no anti-glare property.

FIG. 3 is a schematic sectional view showing the structure of the polarization plate 30 adhered to the glass substrate 28 of the LCD unit 14 and the structure of the AR film 16 adhered to the polarization plate 30 in this embodiment.

As shown in FIG. 3, the polarization plate 30 is adhered to the glass substrate 28 through an adhesion layer 32. The polarization plate 30 has, starting from the side of the glass substrate 28 (the adhesion layer 32) and proceeding toward the side of the AR film 16, a support layer 34, a polarization film 36, a support layer 38, and a hard coat layer (hereinafter abbreviated as HC layer) 40. The support layers 34 and 38 are each made of a TAC film or the like. The polarization film 36 is a PVA/I film or the like having a polarization function (the PVA/I film is obtained by staining a polyvinyl alcohol (PVA) film with iodine (I) and stretching the film). The HC layer 40 is the topmost layer and serves as a protective film.

In addition to the above, the polarization plate 30 of the present invention can employ known materials for the support layers 34 and 38 and for the polarization film 36.

Any material can be used for the HC layer 40 of the present invention as long as it functions as a protective film of the LCD. However, when employed as the LCD unit 14 is a known IPS LCD, the HC layer 40 has to have electrical conductivity.

It is preferable that the HC layer 40 of the present invention is not matted on both the front and rear surfaces but flat and smooth, has no anti-glare property, and works to make transmission light from the LCD unit 14 exit with less scattering. In order to reduce scattering of the transmission light to the lowest possible level, the side of the HC layer 40 from which the transmission light exits the polarization plate 30 has to have a flat and smooth surface. Specifically, the arithmetic average height (Ra, JIS B 0601-2001) of the smooth surface is set at 0.02 μm or less. The arithmetic average height is desirably set at 0.01 μm or less. The maximum height (Rz, JIS B 0601-2001) of the smooth surface is set at 0.04 μm or less, more desirably, 0.02 μm or less. The support layer 38 on which the HC layer 40 is formed preferably has a flat and smooth surface. The arithmetic average height (Ra, JIS B 0601-2001) of the surface of the support layer 38 is set at 0.02 μm or less. The arithmetic average height is desirably set at 0.01 μm or less. The maximum height (Rz, JIS B 0601-2001) of the smooth surface of the support layer 38 is set at 0.04 μm or less, more desirably, 0.02 μm or less.

The AR film 16, which characterizes the present invention most, is placed on the LCD unit 14.

The AR film 16 has an average specular reflectivity of 0.5% or less at an incident angle of 5° in a wavelength range of 450 to 650 nm. This makes it possible to sufficiently prevent external light reflected on the surface of the display 10 from lowering the visibility.

The AR film 16 receives light from a CIE standard light source D65 at an incident angle of 5° in a wavelength range of 380 to 780 nm and reflects the light as regular reflection light whose color tint falls within a range of $-7 \leq a^* \leq 7$ and $-10 \leq b^* \leq 10$ in terms of a* and b* values of CIE 1976 L*a*b* color space. This reduces the reddish purple to bluish purple color in reflected light, which has been a problem of conventional multilayer anti-reflection films. The great reduction in color tint of reflected light leads to a great reduction in uneven color tint of reflected light which is caused by uneven thickness of an anti-reflection layer (AR layer 48, see FIG. 3). More desirably, the average specular reflectivity is 0.3% or less, and a* and b* satisfy $0 \leq a^* \leq 5$ and $-7 \leq b^* \leq 0$. In this way, the visibility and color tint of reflected light are reduced even more, and when applied to a liquid crystal display device (for example, the LCD unit 14), the AR film 16 can neutralize, to an unnoticeable degree, color tint on the display screen reflecting a small amount of external light that has as high luminance as in an indoor fluorescent light.

The AR film 16 has no anti-glare property. Therefore, when used in a medical display that has a high definition matrix structure of 100 to 300 ppi, especially a medical display used for interpretation of a mammographic image which contains minute calcification etc., a displayed image is not blurred but has vividness and sharpness while serious glaring is avoided. In addition, the displayed image is not shifted in the front-to-back direction and therefore has no 'double vision' look. Furthermore, the screen does not assume a whitish appearance, thus preventing dark areas from looking protruded and avoiding lowering of contrast. A diagnosis can therefore be made without trouble.

The AR film 16 having such characteristics is adhered to the HC layer 40, which is the outermost layer of the LCD unit 14, through an adhesion layer 42 as shown in FIG. 3, and has a transparent support layer 44, a hard coat layer (hereinafter also abbreviated as HC layer) 46, and the AR layer. 48 starting from the side of the HC layer 40 (the adhesion layer 42) and proceeding outward. The transparent support layer 44 is made of a TAC film or the like.

Figure 4:
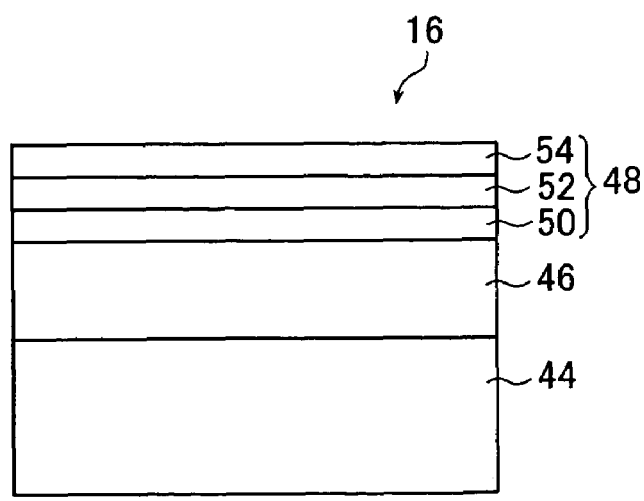
FIG. 4 is a schematic sectional view showing the layer structure of an anti-reflection film in the medical display according to the embodiment shown in FIG. 3.

As shown in FIG. 4, the AR layer 48 has practically three sub-layers: an intermediate refractive sub-layer 50, a high refractive sub-layer 52, and a low refractive sub-layer 54, with these sub-layers 50, 52 and 54 being arranged in this order outwardly from the HC layer 46 side.

In order to achieve the reflectance characteristics which lower the reflectivity and which reduce color tint, refractive indexes n1, n2, and n3 of the intermediate refractive sub-layer 50, the high refractive sub-layer 52 and the low refractive sub-layer 54, which are respectively the three sub-layers of the AR layer 48 placed on the HC layer 46 in the AR film 16, preferably satisfy the following relations when the refractive index of the transparent support layer 44 is given as $n_B$, and the refractive index of the HC layer 46 that is placed on the transparent support layer 44 is given as $n_H$.

$$n3 < n_B, n_H < n1 < n2$$

It is preferable for the intermediate refractive sub-layer 50, the high refractive sub-layer 52 and the low refractive sub-layer 54, that is, the sub-layers of the AR layer 48, to satisfy at a design wavelength λ (500 nm) the following expressions (I), (II) and (III), respectively:

$$\lambda/4 \times 0.80 < n1 \times d1 < \lambda/4 \times 1.00 \quad \text{(I)}$$

$$\lambda/2 \times 0.75 < n2 \times d2 < \lambda/2 \times 0.95 \quad \text{(II)}$$

$$\lambda/4 \times 0.95 < n3 \times d3 < \lambda/4 \times 1.05 \quad \text{(III)}$$

where d1 represents the thickness (nm) of the intermediate refractive sub-layer 50, d2 represents the thickness (nm) of the high refractive sub-layer 52, and d3 represents the thickness (nm) of the low refractive sub-layer 54.

For instance, when the transparent support layer 44 is formed of triacetyl cellulose (refractive index: 1.49), the refractive index n1 is preferably 1.60 to 1.65; n2, 1.85 to 1.95; and n3, 1.35 to 1.45. When the transparent support layer 44 is formed of polyethylene terephthalate (refractive index: 1.66), the refractive index n1 is preferably 1.65 to 1.75; n2, 1.85 to 2.05; and n3, 1.35 to 1.45.

If it is not possible for some reason to choose materials that can give the intermediate refractive sub-layer 50 and the high refractive sub-layer 52 refractive indexes in those ranges, a layer that is practically optically equivalent to the intermediate refractive sub-layer 50 or the high refractive sub-layer 52 that has the set refractive index can be formed by utilizing the principle of equivalent film in which a layer having a higher refractive index than a set refractive index is combined with a layer having a lower refractive index than the set refractive index. This well-known solution is also applicable to obtain the above-described reflectance characteristics of the AR film 16. In the present invention, the phrase "has practically three sub-layers" means that the AR layer 48 may also be composed of four, five, or more sub-layers if an equivalent film as such is used.

The transparent support layer 44 is preferably a plastic film. Examples of plastic film materials include triacetyl cellulose (TAC) and other cellulose esters, polyamide, polycarbonate, polyester, polystyrene, polyolefin, polysulfone, polyether sulfone, polyarylate, polyether imide, polymethyl methacrylate, polyether ketone, and the like.

The light transmittance of the transparent support layer 44 is desirably 80% or higher, more desirably, 86% or higher. The haze ratio of the transparent support layer 44 is desirably 2.0% or lower, more desirably, 1.0% or lower. The refractive index of the transparent support layer 44 is preferably 1.4 to 1.7.

A triacetyl cellulose (TAC, refractive index: 1.49) film is preferred as the transparent support layer 44 particularly when the AR film 16 is adhered to a polarization plate (for example, the polarization plate 30 of the LCD unit 14) or constitutes one side of a surface protective film in order to obtain a liquid crystal display device (the LCD unit 14), an organic EL display device, or the like. A known triacetyl cellulose film such as TAC-TD 80U (a product of Fuji Photo Film Co., Ltd.) makes a satisfactory transparent support layer 44. The material of the transparent support layer 44 can be used also in the support layers 34 and 38 of the polarization plate 30 of the LCD unit 14.

On the other hand, when the AR film 16 is adhered to a glass substrate or the like in order to obtain a flat CRT, a PDP, or the like, the transparent support layer 44 is preferably formed of polyethylene terephthalate (PET, refractive index: 1.66) or polyethylene naphthalate.

The HC (hard coat) layer 46 is provided to give the transparent support layer 44 an anti-abrasion property. The HC layer 46 also has a function of enhancing adhesion between the transparent support layer 44 and a layer formed thereon. A preferable method to form the HC layer 46 is started with application of an application composition that is obtained by adding an inorganic filler to a composition, which is prepared by dissolving in a solvent, oligomers such as multifunctional acrylic monomers, urethane acrylates, epoxy acrylates, and various polymerization initiators. The inorganic filler is silica, alumina, or the like and is added in accordance with reinforcement and other needs. Then, the solvent is dried and the applied composition is cured by heat and/or ionizing radiation. The same method can be used to form the HC layer 40 of the polarization plate 30 of the LCD unit 14.

Of the three sub-layers of the AR layer 48, the intermediate refractive sub-layer 50 and the high refractive sub-layer 52 are formed by applying an application composition, which contains inorganic fine particles high in refractive index, a monomer curable by heat or ionizing radiation, a polymerization initiator, and a solvent, drying the solvent, and then curing the applied composition by heat and/or ionizing radiation. The inorganic fine particles are preferably particles of at least one kind of metal oxide chosen from oxides of Ti, Zr, In, Zn, Sn, and Sb. The thus formed intermediate refractive sub-layer 50 and high refractive sub-layer 52 are superior in anti-abrasion property and adhesion to ones that are obtained by applying and then drying a polymer solution with high refractive index. In order to ensure the dispersion liquid stability, the strength of the cured film, and the like, the application composition desirably contains a multifunctional (meth)acrylate monomer and an anionic group-containing (meth)acrylate dispersion liquid.

The inorganic fine particles preferably have a mean particle size of 1 to 100 nm when measured by the Coulter counter method. If the mean particle size is less than 1 nm, the specific surface area is too large, and the fine particles lack stability in the dispersion liquid, which is undesirable. On the other hand, inorganic fine particles whose mean particle size exceeds 100 nm cause scattering of visible light due to a difference in refractive index between the particles and the binder, thus undesirably increasing the haze ratio. The haze ratio of the intermediate refractive sub-layer 50 and the high refractive sub-layer 52 is desirably 3% or less, more desirably, 0.5% or less.

A fluorine-containing resin curable by heat or ionizing radiation is used in the low refractive sub-layer 54. Examples of this curable, fluorine-containing resin include a perfluoroalkyl group-containing silane compound (e.g., (heptadecafluoro-1,1,2,2-tetradecyl) triethoxysilane), and a fluorine-containing copolymer that has as its structural units a fluorine-containing monomer and a monomer that provides the cross-linking ability.

Specific examples of a fluorine-containing monomer unit include fluoroolefins such as hexafluoropropylene, partially or fully fluorinated alkyl ester derivatives of (meth)acrylic acid, and partially or fully fluorinated vinyl ethers. Of these examples, hexafluoropropylene is particularly desirable in view of low refractive index and ease of handling the monomer.

Employed as a monomer that provides the cross-linking ability is, for example, glycidyl methacrylate or other (meth) acrylate monomer possessing a cross-linkable functional group in its molecule, or a (meth)acrylate monomer having a carboxyl group, a hydroxyl group, an amino group, a sulfonic acid group, or the like.

In place of a polymer that has the above fluorine-containing monomer as its structural unit, a copolymer including a fluorine-free monomer may be employed.

Preferably, a fluorine-containing resin used to form the low refractive sub-layer 54 is given an anti-abrasion property by adding ultra-fine particles of a silicon oxide. The anti-abrasion property deteriorates as the refractive index of the fluorine-containing resin is lowered, although a lower refractive index means better anti-reflection property. Accordingly, the refractive index of the fluorine-containing resin and the amount of silicon oxide ultra-fine particles added are optimized to reach the best balance between anti-abrasion property and low refractive index.

As to silicon oxide ultra-fine particles, a commercially-available silica sol in which silica is already dispersed in an organic solvent may be added as it is to the application composition. Alternatively, the silicon oxide ultra-fine particles may be prepared by dispersing various types of commercially-available silica powder in an organic solvent.

The AR film 16 may additionally have a forward scattering layer, an anti-static layer, an undercoat layer, and a protective layer.

The forward scattering layer provides an effect of improving the viewing angle when the AR film 16 is applied to a liquid crystal display device, and the viewing angle is tilted vertically and laterally. If fine particles having different refractive indexes are diffused in the HC layer 46, a hard coat function is obtained at the same time.

Each layer of the AR film 16 can be formed by application. Examples of application methods employable for the layers of the AR film 16 include dip coating, air knife coating, curtain coating, roller coating, wire bar coating, gravure coating, micro-gravure coating, and extrusion coating. Of these application methods, micro-gravure coating and gravure coating are desirable since the two methods require a minimum wet application amount and thus the coat dries evenly. The gravure method in particular is preferred from the viewpoint of obtaining uniform film thickness in the lateral direction. Two or more layers may be applied at the same time.

In the present invention, the anti-glare property for obscuring reflection of background light on the display screen must not be imparted when forming the multilayer AR film 16 by wet application of the application composition. Specifically, the front surface of the AR film 16, in particular, the front surface (and preferably rear surface) of the HC layer 46 and the AR layer 48 have to be flat and smooth unlike in the common treatment in which the AR layer 48 is formed on the front surface of the HC layer 46 that is made uneven by including matte particles or the like, or the front surface of the AR layer 48 is made irregular by embossing or other method.

In a preferred embodiment of the present invention, both sides of the AR film 16, in particular, the front and rear surfaces of the HC layer 46 and the AR layer 48 are not matted, but the AR film 16 is flat and smooth and has no anti-glare property. The AR film 16 should work to lessen scattering when transmission light from the LCD unit 14 exits the AR film 16. In order to reduce scattering of transmission light to the lowest possible level, the side of the AR layer 48 of the AR film 16 from which transmission light exits has to have a flat and smooth surface. Specifically, the arithmetic average height (Ra, JIS B 0601-2001) of the smooth surface is set at 0.02 µm or less. More desirably, the arithmetic average height is set at 0.01 µm or less. The maximum height (Rz, JIS B 0601-2001) of the smooth surface is set at 0.04 μm or less, more desirably, 0.02 μm or less.

By making the surface flat, the AR film 16 can have more uniform thickness, which brings out desirable results in reduction of uneven color tint and improvement in AR performance.

The transparent support layer 44 on which the HC layer 46 is formed preferably has a flat and smooth surface. The arithmetic average height (Ra, JIS B 0601-2001) of the surface of the support layer 44 is set at 0.02 μm or less. The arithmetic average height is desirably set at 0.01 μm or less. The maximum height (Rz, JIS B 0601-2001) of the smooth surface is set at 0.04 μm or less, more desirably, 0.02 μm or less.

Figure 5:
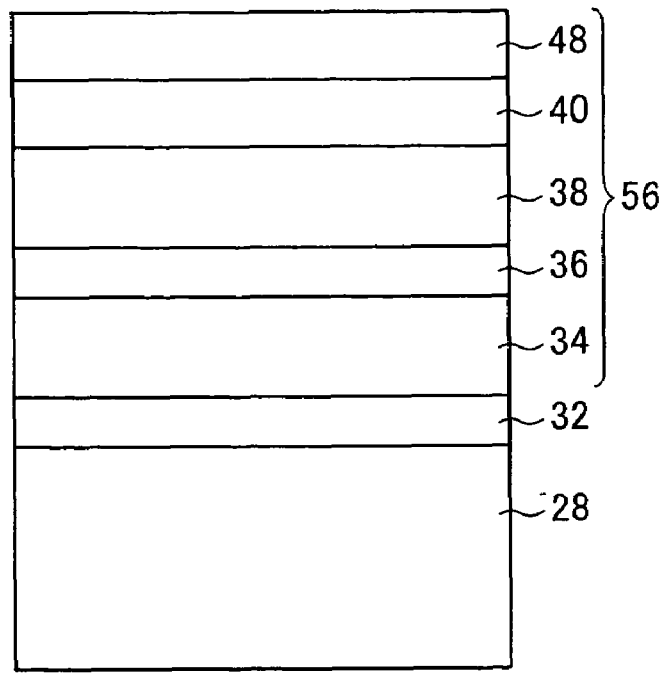
FIG. 5 is a schematic side view showing a layer structure of a main part of a medical display according to another embodiment of the present invention.

The embodiment shown in FIG. 3 is also applicable for a medical display that utilizes a conventional liquid crystal display device or when a commercially-available liquid crystal display device is used as a medical display as long as the display has a resolution of 100 to 300 ppi. The AR film 16 in this embodiment is adhered with an adhesive to the outer surface of the polarization plate 30, which constitutes the outermost layer of the LCD unit 14. However, the present invention is not limited thereto, and a variation shown in FIG. 5 may be employed. In FIG. 5, the support layer 38 and the HC layer 40 of the polarization plate 30 double as the support layer 44 and the HC layer 46 of the AR film 16 to create a new polarization plate 56 with the AR layer 48 in which the polarization plate 30 and the AR film 16 are integrally formed. The polarization plate 56 is adhered to the glass substrate 28 of the LCD unit 14 through the adhesion layer 32.

In other words, instead of bonding the AR film 16 through the adhesion layer 32 to the completed LCD unit (LCD panel) 14 to which the polarization plate 30 has already been attached, the polarization plate 56 in which the AR film 16 constitutes one side of a surface protective film of a polarizer (the polarization film 36) may be employed. In this way, the AR property can be obtained in the process of manufacturing the LCD panel 14.

The polarization plate 56 shown in FIG. 5 is adhered to the glass substrate 28 through the adhesion layer 32. The polarization plate 56 has, starting from the side of the glass substrate 28 (the adhesion layer 32) and proceeding outward, the support layer 34, the polarization film 36, the support layer 38, the HC layer 40, and the AR layer 48, which is the topmost layer. Accordingly, it can be said that the polarization plate 56 is obtained by forming, through application, for example, the AR layer 48 on the polarization plate 30 of FIG. 3 which is composed of the support layer 34, the polarization film 36, the support layer 38, and the HC layer 40. It can also be said that the polarization plate 56 is obtained by replacing the surface protective film which is composed of the support layer 38 and the HC layer 40 on one side of the polarization plate 30 of FIG. 3 with the AR film 16.

The embodiment shown in FIG. 5 needs to incorporate the dedicated polarization plate 56 in a medical display of the present invention. On the other hand, the embodiment shown in FIG. 5 requires less intervening layers than the embodiment shown in FIG. 3 does and therefore can provide a wider dynamic range of shades for a displayed image, thus making the image appropriate as a diagnostic image.

Figure 6A:
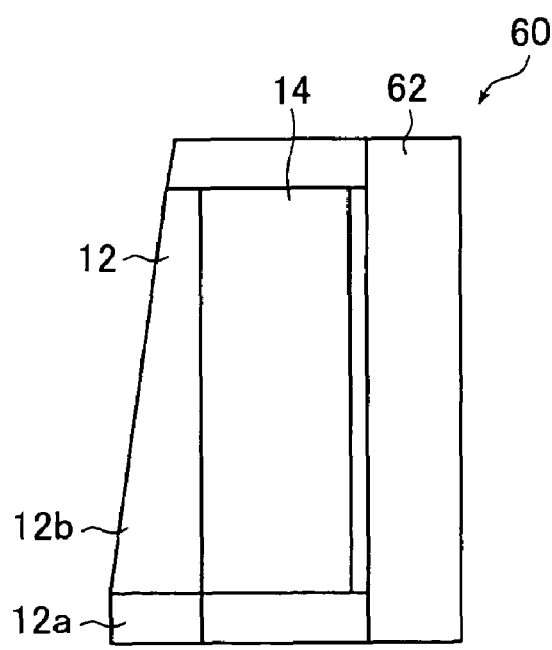
FIG. 6A is a schematic side view of a medical display according to still another embodiment of the present invention.
Figure 6B:
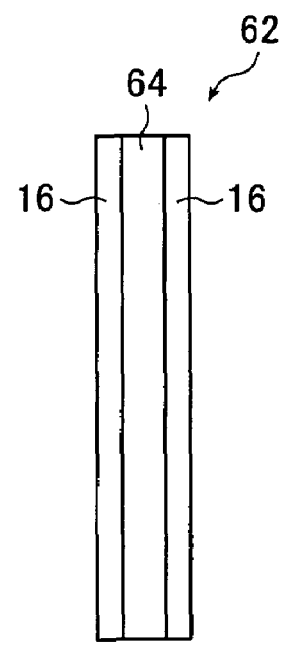
FIG. 6B is a schematic sectional view of an example of a protective panel assembly for the medical display shown in FIG. 6A.

In the embodiments described above, the AR layer 48 or the AR film 16 is placed on the front surface of the display 10, or the polarization plate 56 with the AR layer 48 constituting the topmost layer is employed as the polarization plate of the LCD unit 14 or is adhered to the front surface of the LCD unit 14. However, the present invention is not limited to the above embodiments, and a protective panel assembly 62 shown in FIGS. 6A and 6B may be employed. The protective panel assembly 62 is obtained, as shown in FIG. 6B, by bonding the AR film 16 through an adhesive layer to each side (the front and rear surfaces) of a protective panel 64, which is a transparent acrylic board or the like. As shown in FIG. 6A, the protective panel assembly 62 is attached to the front of a medical display 60 while securing a given distance between the assembly 62 and the display screen of the display 60, that is, the front surface of the LCD unit 14, and thus avoiding a contact between the two.

Although the AR film 16 is bonded to each side of the protective panel 64 with an adhesive in the medical display 60 of FIGS. 6A and 6B, the present invention is not limited thereto. Instead, the AR layer 48 may be formed by, for example, application on each side of the transparent protective film 64 to obtain the protective panel assembly 62.

When the gradation of the medical display 10 or 60 is corrected (calibrated) according to GSDF of DICOM in a medical display system, which will be described later, a gradation correction table is made taking into account the medical display's surface reflection luminance (hereinafter also referred to as peripheral light reflection luminance) which is dependent on environmental light or external light in addition to the luminance of the medical display. Measuring the peripheral light reflection luminance with accuracy requires a remote-sensing luminance meter. However, the remote-sensing luminance meter is not easy to handle, and a contact type luminance meter is often employed for the sake of convenience. It is preferable to use the remote-sensing luminance meter in periodical measurement of the peripheral light reflection luminance by a service person or a maintenance person while, on a day-to-day basis, the contact type luminance meter is used to measure the peripheral light reflection luminance and correction is made on the measurements before the data are used (see commonly assigned Japanese Patent Application No. 2003-0264843).

In this case, if the contact type luminance meter is brought into direct contact with the front surface of the LCD unit (panel) 14, the LCD unit (panel) 14 is deformed by the pressure and the display luminance is fluctuated as a result. For that reason, it is desirable to place the protective panel 64 or the protective panel assembly 62 at a given distance from the front surface of the LCD unit (panel) 14 as shown in FIG. 6A. When placing the protective panel 64, the AR property has to be provided by adhering the AR film 16 to the protective panel 64 or by forming the AR layer 48 on the protective panel 64.

Therefore, the distance between the front surface of the LCD unit 14 and the protective panel 64 or the protective panel assembly 62 should be large enough to avoid deformation of the LCD unit (panel) 14 and fluctuation in display luminance when the contact type luminance meter is brought into direct contact with the protective panel 64 or the protective panel assembly 62. On the other hand, too large a distance between the LCD unit 14 and the protective panel 64 or the protective panel assembly 62 is not desirable for observation. An appropriate gap is chosen from between 2 mm and 20 mm, for example, to suit the rigidity of the protective panel 64. Usually, about 5 to 20 mm is appropriate, but the gap may be set at 2 to 10 mm if the protective panel 64 has high rigidity.

When adhered to the polarization plate 30 of the LCD unit (panel) 14 as shown in FIG. 3, or when constituting one side of the surface protective film of the polarizer as shown in FIG. 5, the AR film 16 of the present invention is suitable for transmissive, reflective, or semi-transmissive liquid crystal display devices (LCDs) which are of twisted nematic (TN) mode, super twisted nematic (STN) mode, vertical alignment (VA) mode, in-plane switching (IPS) mode, optically-compensated bend cell (OCB) mode, or the like and which are applicable as medical displays. If the AR film 16 of the present invention is used in combination with a commercially-available luminance improving film (a polarization splitter film having a polarization selective layer, for example, D-BEF, a product of Sumitomo 3M) in a transmissive or semi-transmissive liquid crystal display device, the display device can have even higher visibility.

When placing a protective panel (front panel) such as an acrylic board over the entire surface of a liquid crystal cell of a transmissive, reflective, or semi-reflective liquid crystal display device with air filling a gap between the liquid crystal cell and the protective panel as shown in FIGS. 6A and 6B, it is preferable to apply, through an adhesive or the like, the AR film 16 to the inside and/or outside of the protective panel (front panel) as well as to a polarization plate on the front side of the liquid crystal cell since reflection at the interface is reduced. If combined with a λ/4 plate, the AR film 16 can be used as a surface protective plate for reflective or semi-transmissive LCDs and organic EL displays. Furthermore, by forming the AR layer on a transparent support made of PET, PEN, or the like, the present invention is applicable to image display devices such as plasma display panels (PDPs) and cathode ray tube display devices (CRTs).

Basically, a medical display of the present invention is structured as above.

In a particularly desirable mode of a medical display according to the present invention, a gradation correction table is made taking into account the peripheral light reflection luminance (surface reflection luminance dependent on environmental light when the power is turned off) in addition to the luminance of the medical display to correct (calibrate) the gradation of the medical display in accordance with GSDF of DICOM for the quality control (QC) of the medical display. Therefore, the peripheral light reflection luminance has to be measured accurately as well as the luminance of the medical display.

For that reason, a medical display of the present invention is most effective when built into a medical display system equipped with a luminance meter that is capable of measuring the peripheral light reflection luminance as well as the luminance of the medical display with accuracy. An embodiment of such medical display system is shown in FIG. 7.

A medical display system (hereinafter simply referred to as system) 70 shown in FIG. 7 has the display 10 described above and a luminance meter 72. The display 10 has the LCD unit 14, the AR film 16, a backlight unit (not shown in FIG. 7, see the backlight unit 12 in FIG. 1), and a display controlling unit 74.

Figure 7:
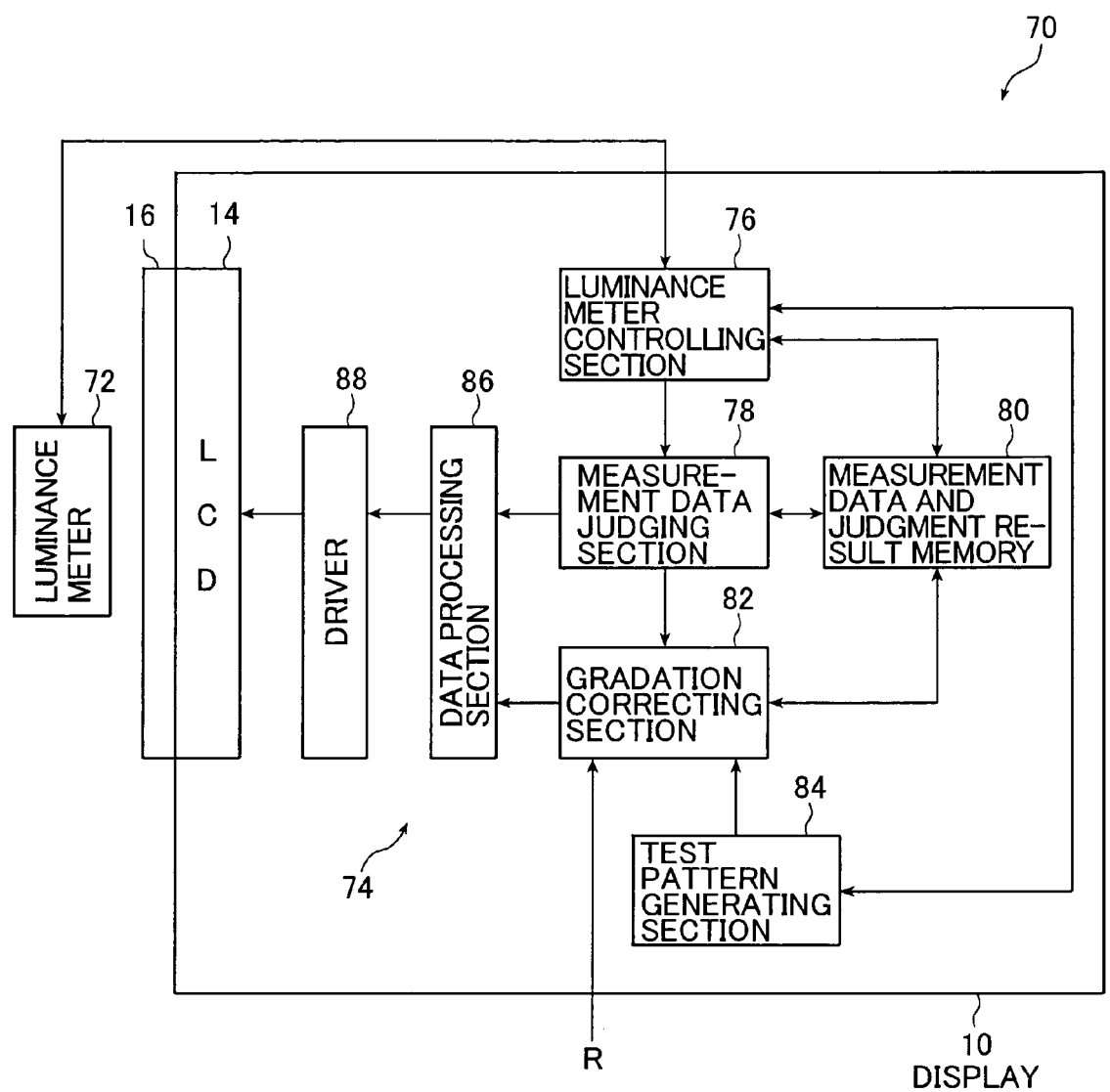
FIG. 7 is an explanatory diagram schematically showing a structure of a medical display system according to an embodiment of the present invention.

In the embodiment shown in FIG. 7, the system 70 has the display 10 as a typical example. However, the present invention is not limited to the display 10 and any image display device that is applicable to a medical display of the present invention can be employed in the system. Image display devices of the various modes given in the above as well as the display 60 shown in FIGS. 6A and 6B are employable by the system.

The luminance meter 72 measures, in addition to the display luminance of the medical display 10, the peripheral light reflection luminance with accuracy, in other words, the display luminance (luminance of each portion when a test pattern is displayed) of the display screen when the power of the LCD unit 14 of the display 10 is turned on (while the backlight unit is lit), namely, in the present invention (the system 70), the display luminance through the AR film 16, in particular, the maximum luminance, the minimum luminance, and the surface reflection luminance of the display screen when the power of the LCD unit 14 is turned off (while the backlight unit is turned off and no image is displayed) (which will be also hereinafter referred to as peripheral light reflection luminance), namely, in the present invention, the surface reflection luminance of the AR film 16.

The luminance meter 72 can be one chosen from known luminance meters in accordance with the types of medical displays applicable to the present invention. However, a remote-sensing luminance meter is preferred in order to measure with accuracy the display's luminance as well as the peripheral light reflection luminance. As described above, a remote-sensing luminance meter should be chosen particularly in the display 10 or other liquid crystal display devices (LCDs) and organic or other ELDs and PDPs where a contact between the display screen and a contact type luminance meter affects displayed image.

On the other hand, when attaching a luminance meter to the display screen does not affect a displayed image as in CRTs, a contact type luminance meter which is simpler and easier to handle can be employed since a remote-sensing luminance meter is not easy to handle. If it is desired to use a contact type luminance meter in a medical display system that has an LCD, an ELD, or a PDP, a protective panel assembly is employed as in FIGS. 6A and 6B where the protective panel assembly 62 is attached to the casing of the display 60, or a protective panel such as the protective panel 62, which is attached to the casing of the display 10 shown in FIG. 1, is employed.

In the case where the simpler option is chosen and a contact type luminance meter is used to measure the display's luminance, the measurements may be immediately put into use but it is preferable to measure the peripheral light reflection luminance with a remote-sensing luminance meter in maintenance works or periodic calibration by a service person or a maintenance person while the contact type luminance meter is used for routine calibration and, before the measurements are put into use, correction is made on the data in light of the peripheral light reflection luminance measured by the remote-sensing luminance meter.

According to this method of measuring the display's luminance, accurate luminance measurements can always be obtained and measurement deviation caused by brightness of external light (peripheral light) depending on where the display is set up can be corrected appropriately (for details, see commonly assigned Japanese Patent Application No. 2003-0264843).

In the present invention, it is preferable to connect the luminance meter 72 and the display 10 (the display controlling unit 74) online as in the embodiment shown in FIG. 7, so that the luminance can be measured in sync with display of a luminance measurement test pattern on the display screen of the display 10. This synchronization is achieved by a luminance meter controlling section 76 of the display controlling unit 74 which will be described later.

Although the luminance meter 72 is connected online to the display 10 (the display controlling unit 74) in the embodiment shown in FIG. 7, the present invention is not limited thereto. For instance, a luminance meter that is not connected online to the display 10 may be used to measure the luminance of the display 10 which is then inputted to the display controlling unit 74 of the display 10 using a keyboard or the like.

The display controlling unit 74 is a unit for controlling all there is to display an image on the LCD unit 14, including calibration of an image displayed on the LCD unit 14. The display controlling unit 74 has the luminance meter controlling section 76, a measurement data judging section (hereinafter simply referred to as judging section) 78, a measurement data and judgment result memory (hereinafter abbreviated as memory) 80, a gradation correcting section 82, a test pattern generating section 84, a data processing section 86, and a driver 88.

The luminance meter controlling section 76 has a function of controlling the luminance meter 72, the backlight unit of the display 10, the test pattern generating section 84, and the driver 88 to measure the surface reflection luminance (peripheral light reflection luminance) of the display 10 when the power is turned off and the display luminance of the display 10 when the power is turned on (hereinafter abbreviated as display luminance). The luminance meter controlling section 76 of the embodiment shown in FIG. 7 turns off the backlight unit in the LCD unit 14 of the display 10 and controls the luminance meter 72 to measure as the peripheral light reflection luminance the surface reflection luminance of the AR film 16 on the LCD unit 14. On the other hand, the luminance meter controlling section 76 turns the backlight unit on, controls the driver 88 to drive the LCD unit 14 to display a luminance measurement test pattern (test chart) based on test pattern data that was generated by the test pattern generating section 84, and controls the luminance meter 72 to measure the display luminance of the luminance measurement test pattern displayed on the LCD unit 14 (the luminance of each portion of the pattern, namely, each test chart). When the luminance meter 72 is connected online to the display 10 (the display controlling unit 74) as in the embodiment shown in FIG. 7, the luminance meter controlling section 76 preferably commands the luminance meter 72 to start measuring the luminance in sync with display of the luminance measurement test pattern on the display screen of the display 10.

For the QC of the display, the judging section 78 judges measurement data including the surface reflection luminance measured by the luminance meter 72 when the power is turned off and the display luminance (maximum luminance, minimum luminance, and the like) measured by the luminance meter 72 when the power is turned on.

For instance, if an invariance test is an item of the QC, the judging section 78 calculates the rate or amount of change of measurement data from the initial value, namely, the initial surface reflection luminance or the initial display luminance (maximum luminance, minimum luminance, and the like), and judges whether or not the obtained rate of change or amount of change is within a preset acceptable range.

The judging section 78 may also be structured to judge that gradation correction is necessary when the judgment result of measurement data is outside the acceptable range in the invariance test or, even if within the acceptable range, meets a preset condition. An example of the latter case is when the amount or rate of change in maximum luminance does not balance with the amount or rate of change in minimum luminance.

The measurement data including the peripheral light reflection luminance and the display luminance (maximum luminance and minimum luminance) measured by the luminance meter 72, and the result of judgment made by the judging section 78 based on the measurement data are sent as display data from the judging section 78 to the data processing section 86. The data processing section 86 converts the display data into drive signals and sends the signals to the driver 88. The display data are then displayed on the LCD unit 14 by the driver 88. Accordingly, the judging section 78 of the display controlling unit 74 also has a function of displaying the measurement data and judgment result on the display. The measurement data and judgment result may be outputted in the form of a hard copy by a printer (not shown) or the like in place of displaying on the display.

The measurement data and judgment result are displayed on the LCD unit 14 of the display 10, which is for displaying a medical image, in the embodiment shown in FIG. 7. However, the present invention is not limited thereto and the data may be displayed on other displays, for example, other medical displays, administrative displays, and monitors (displays) of personal computers or the like for administrative use.

The memory 80 has a function of storing measurement data including the peripheral light reflection luminance and the display luminance (maximum luminance and minimum luminance) measured by the luminance meter 72 (in short, luminance measurement results), a result of judgment made by the judging section 78 based on the measurement data (in short, quality control result), a gradation characteristic result, and the history of these results. The luminance measurement results, quality control result, gradation characteristic result, and history of these results which are stored in the memory 80 can be read out to be displayed or outputted in the form of a hard copy as the need arises.

The gradation correcting section 82 displays a medical diagnostic image on the LCD unit 14 at an appropriate luminance and in a given gradation. The gradation correcting section 82 makes or calibrates a gradation correction table (LUT) for correcting the gradation of medical diagnostic image data to obtain image data that has a given luminance and gradation (gradation characteristic), preferably, gradation data having a luminance that conforms to GSDF of DICOM. The gradation correcting section 82 also stores the gradation correction table and, using the stored gradation correction table, converts image data of a medical diagnostic image supplied from an external medical measurement apparatus (image pickup and diagnostic) apparatus or the like into image data having a given gradation characteristic (GSDF of DICOM).

For example, when correcting the gradation in accordance with GSDF of DICOM, the gradation correcting section 82 determines, as a gradation characteristic (hereinafter referred to as measured gradation characteristic), the peripheral light surface reflection luminance of the display 10 and the relation between the size of input image data necessary to display each portion (e.g., gray scale) of a display test pattern, and the size of measurement data of the display luminance in each portion (gray scale) of the test pattern displayed on the display 10. The gradation correcting section 82 compares the measured gradation characteristic obtained with the gradation characteristic of GSDF of DICOM, and creates a gradation correction table such that the gradation characteristic of each portion (gray scale) of the test pattern matches the gradation characteristic of GSDF. When making the gradation correction table in the gradation correcting section 82, a characteristic value at a point between two portions (gray scales) of the test pattern can be obtained by interpolation, for example, linear interpolation or secondary interpolation.

Next, the gradation correcting section 82 uses the thus created gradation correction table to correct the gradation of the test pattern data generated by the test pattern generating section 84. The obtained test pattern data with corrected gradation is converted in the data processing section 86 into drive signals for the LCD unit 14 to display the test pattern on the LCD unit 14 of the display 10. Thereafter, the display luminance of the test pattern displayed on the display 10 is measured again to obtain a measured gradation characteristic of the display 10, and the measured gradation characteristic obtained is compared with the gradation characteristic of GSDF.

At this point, if the error between the measured gradation characteristic and the gradation characteristic of GSDF is within a given range, calibration of the gradation correction table is ended.

On the other hand, if the error between the measured gradation characteristic and the gradation characteristic of GSDF is outside the given range, calibration of the gradation correction table is repeated in the manner described above until the error between the measured gradation characteristic and the gradation characteristic of GSDF falls within the given range.

In this way, the gradation correcting section 82 creates or calibrates a gradation correction table for achieving appropriate gradation correction (for details about the QC of the display which includes an invariance test and calibration, see commonly assigned Japanese Patent Application No. 2002-332335). Through such quality control of a medical display, stable observation of a displayed image which is an optimal representation of image data is always ensured in any kind of medical display system.

DICOM regulates that a test pattern displaying each portion (gray patch) against a background whose luminance is 20% of the maximum luminance of the display device in question must be used to correct the display gradation of the display device in accordance with the gradation characteristic of GSDF. Therefore, a preferable way is to display a test pattern on the display device, then measure the displayed test pattern in pre-measurement to obtain the 20% luminance level of the maximum luminance of the display device, make a modification to display the test pattern against a background that has the 20% luminance level, and then measure the luminance for creating or calibrating a gradation correction table. In this way, automatic luminance measurement and calibration are made possible (for details, see commonly assigned Japanese Patent Application No. 2002-374588). A test pattern or the like regulated with display luminance can thus be displayed in measuring the luminance of a medical display. For instance, when creating a gradation correction table according to the GSDF gradation of DICOM, the gradation correction table can be made from the luminance measured accurately and therefore the objective gradation characteristic is attained and appropriate image display is achieved.

The test pattern generating section 84 is for generating test pattern data in order to display on the display 10 a test pattern necessary for the QC of the display 10. Test patterns generated by the test pattern generating section 84 are not limited to ones for the invariance test and the calibration described above. Examples of test patterns that can be generated by the test pattern generating section 84 include a gray scale pattern for evaluating the reproducibility of gray scale which is regulated by JIS Z4752-2-5, a resolution pattern for evaluating the reproducibility of the resolution, a screen distortion pattern for evaluating the distortion of an image, a color pattern for evaluating the reproducibility of colors, and an SMPTE pattern for visual check which is regulated by SMPTE RP (Recommended Practice)-133.

The data processing section 86 converts test pattern data generated by the test pattern generator 84, image data of a medical diagnostic image supplied from a medical measurement (image pickup and diagnostic) apparatus or the like, measurement data from the luminance meter 72, and a result of judgment made by the judging section 78 into drive signals, which are sent to the driver 88. The driver 88 drives the LCD unit 14 to display the data.

The driver 88 is for modulation driving the LCD unit 14 to display on the LCD unit 14 a test pattern, a medical diagnostic image, luminance measurement data, and a judgment result in response to drive signals supplied from the data processing section 86.

Basically, a medical display system of the present invention is structured as above.

A specific description is given below on the present invention through Examples.

EXAMPLE 1

An AR film 16 for use in the medical display 10 of the present invention was made in the manner described below. Each AR film sample was prepared by application using a gravure coater.

In a first step, an application solution containing silica filler and UV-curable acrylic resin was applied to the top face of the transparent support layer (refractive index: 1.49, thickness 80 μm) 44, which was made from a triacetyl cellulose film, TAC-TD 80U (a product of Fuji Photo Film Co., Ltd.). The applied solution was dried and cured by ultra-violet irradiation to form a hard coat layer (refractive index: 1.51, thickness 6 μm) 46.

In a second step, an application solution containing dispersed titanium dioxide having a mean particle size as measured by the Coulter method of 42 nm, and UV-curable acrylic resin was applied to the top face of the hard coat layer 46. The applied solution was dried and cured by ultra-violet irradiation to form an intermediate refractive sub-layer (refractive index: 1.63, thickness 67 μm) 50.

In a third step, an application solution which was similar to the one used in the second step but was increased in weight ratio of titanium dioxide was applied to the top face of the intermediate refractive sub-layer 50. The applied solution was dried and cured by ultra-violet irradiation to form a high refractive sub-layer (refractive index: 1.90, thickness 107 μm) 52.

In a fourth and last step, an application solution containing thermally-curable fluorine polymer and silica sol was applied to the top face of the high refractive sub-layer 52. The applied solution was dried and cured by heat to form a low refractive sub-layer (refractive index: 1.43, thickness 86 nm) 54.

The AR film 16 used in the medical display 10 of the present invention was thus obtained. When measured by an AFM (Atomic Force Microscope), the AR film had such surface roughness that Ra=0.005 μm or less and Rz=0.01 μm or less.

The refractive indexes n and thicknesses d of the refractive layers of the AR film 16 according to Example 1 were checked against the design formula with the design wavelength λ set at 500 nm.

1) The value nd (n1×d1) of the intermediate refractive sub-layer 50 is 109.21 and satisfies Expression (I).

$$\lambda/4 \times 0.80 (=100) < nd(=109.21) < \lambda/4 \times 1.00 (=125)$$

2) The value nd (n2×d2) of the higher refractive index is 203.3 and satisfies Expression (II).

$$\lambda/2 \times 0.75 (=187.5) < nd(=203.3) < \lambda/2 \times 0.95 (=237.5)$$

3) The value of the lower refractive index satisfies Expression (III).

$$\lambda/4 \times 0.95 (=118.75) < nd(=122.98) < \lambda/4 \times 1.05 (=131.25)$$

COMPARATIVE EXAMPLE 1

Physical vapor deposition was employed to form, on the hard coat layer 46 of Example 1, a titanium oxide film (refractive index: 2.39, film thickness: 25 nm) and a silicon oxide film (refractive index: 1.47, film thickness: 25 nm). The two films practically served as an intermediate refractive sub-layer. Then a titanium oxide film (film thickness: 46 nm) and a silicon oxide film (film thickness: 97 nm) were formed in this order by physical vapor deposition as a high refractive sub-layer and a low refractive sub-layer, respectively, thus obtaining an AR film.

The AR films of Example 1 and Comparative Example 1 were evaluated as such.

Figure 8:
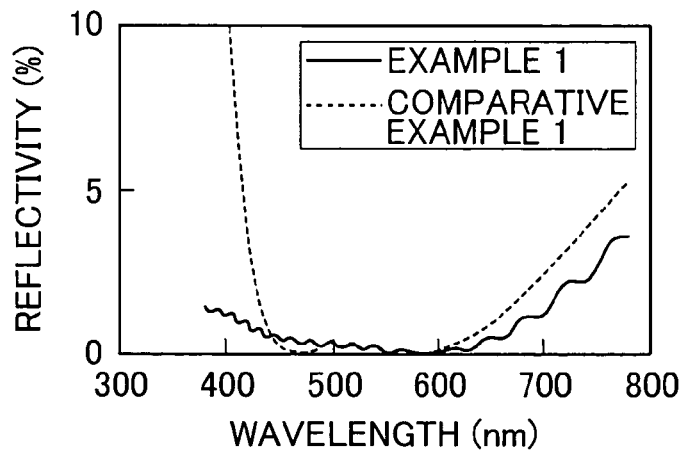
FIG. 8 is a graph showing the relation between the reflectivity and wavelength in anti-reflection films of Example 1 of the present invention and Comparative Example 1.

An adaptor (ARV-474) was attached to a spectrophotometer (V-550, a product of Jasco Corporation) to measure the specular reflectivity at an exit angle of −5° when the incident angle is 5° in a wavelength range of 380 to 780 nm. The results are shown in FIG. 8. At the same time, the average reflectivity in a wavelength range of 450 to 850 nm was calculated to evaluate the anti-reflection property. Furthermore, L*, a* and b* values of CIE 1976 L*a*b* color space representing the color tint of light under regular reflection with respect to the incident light at an incident angle of 5° from a CIE standard light source was calculated from the measured reflection spectrum to evaluate the color tint of the reflected light. The evaluation results are shown in Table 1.

TABLE 1

|  | Average reflectivity (%) | Color tint a*/b* |
| --- | --- | --- |
| Example 1 | 0.28 | 2/−6 |
| Comparative Example 1 | 0.33 | 9/−10 |

Figure 9:
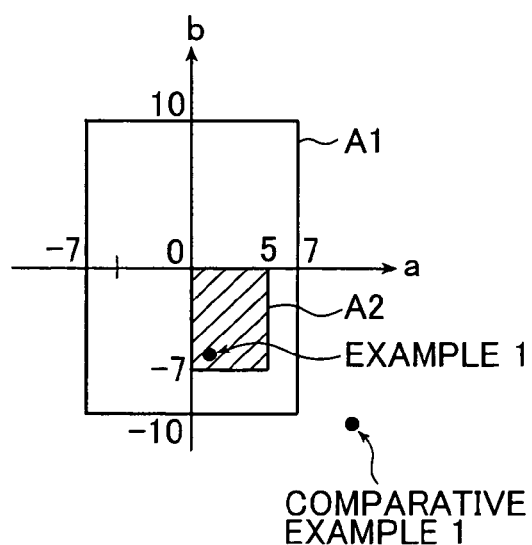
FIG. 9 is a graph showing the color tint of anti-reflection films of Example 1 of the present invention and Comparative Example 1 on the $a^*b^*$ plane in CIE 1976 $L^*a^*b^*$ color space.

As shown in Table 1, the average reflectivity in a wavelength range of 450 to 850 nm is 0.28% for the AR film of Example 1 and 0.33% for the AR film of Comparative Example 1. Both AR films are thus low in average reflectivity (0.4% or less) and are well capable of avoiding reflection on the display screen. On the other hand, in terms of color tint, a* and b* values of the AR film in Comparative Example 1 are 9 and −10, respectively, which are outside a region Al in FIG. 9 (limited region in the present invention), and the film has failed to meet the requirement whereas the AR film of Example 1 satisfies the requirement since a* and b* values of the film are 2 and −6, respectively, thus falling within a region A2 (a preferably limited region in the present invention), which is inside the region A1 of FIG. 9.

The above results show that the AR film of Example 1 is successful in lowering the reflectivity and reducing the color tint at the same time, and has obtained a preferable reflection characteristic.

EXAMPLE 2

In Example 2, the AR film 16 of Example 1 was attached to a monochrome liquid crystal display device (LCD) for evaluation.

Using an adhesive material, the AR film 16 of Example 1 was adhered to the front surface of a monochrome LCD currently used as a medical LCD monitor (FC-2090, a product of EIZO NANAO CORPORATION, panel size: 20.8", number of pixels: QXGA=2048×1536, pixel size: 207 µm=123 ppi, an IPS (In-Plane Switching) display with each pixel having three monochrome sub-pixels). The LCD has no anti-glare property.

A monochrome LCD to which the AR film of Example 1 was not adhered was prepared as Comparative Example 2. The LCD of Comparative Example 2 was, in other words, an existent monochrome LCD which was mostly identical to the LCD panel of Example 2 and had no anti-glare property but had the front surface treated in a different manner. Prepared as Comparative Example 3 was a monochrome LCD to which an AG film (surface roughness: Ra (arithmetic average height) =0.08 to 1.15 µm and Rz (maximum height)=0.7 to 1.2 µm) having no AR property was adhered instead of an AR film. The Comparative Examples 2 and 3 was also evaluated for comparison.

A CR image, a CT image, or other medical images were displayed on the medical LCD monitors of Example 2 and Comparative Examples 2 and 3 to evaluate through visual inspection, the medical images displayed for reflection of the surroundings, the color tint, imbalance between black and white due to peripheral light, glare, the look of 'double vision', and the sharpness and vividness.

The evaluation results are shown in Table 2.

Reflection on the display screen was evaluated based on whether or not reflection light of an observer on the monitor screen was noticeable. When the reflection was ignorable, the monitor was marked with a circle (success) in Table 2. When the reflection was noticeable, the monitor was marked with an X (failure). As to the evaluation of the color tint, a circle was given when reflected light had no color but neutral, and an X was given when the reflected light was colored. The imbalance between black and white due to peripheral light was evaluated in three grades: the circle mark indicates that the screen does not look whitish (there is no black area standing out); the triangular mark indicates that the screen appears a little whitish; and the mark X means that the screen definitely has a whitish appearance. A circle was given when no glare was recognized, whereas an X was given when the screen was glaring. In the evaluation of the look of 'double vision', the circle mark was given when the image did not have a 'double vision' look, and the X mark was given when it did. The sharpness and vividness were evaluated in three grades: a circle means that the image is not blurred at all and is vivid; a triangle means that the image is rather blurred; and an X means that the image is blurred and dull.

TABLE 2

|  | Example 2 | Comparative Example 2 | Comparative Example 3 |
| --- | --- | --- | --- |
| Reflection | ○ [Reflection of observer is ignorable] | X [Reflection of observer is noticeable] | ○ [Reflection is obscured and therefore ignorable] |
| Color tint | ○ | ○ | ○ |
| Imbalance between black and white due to peripheral light | ○ | ○ | Δ |
| Glare | ○ | ○ | X |
| Look of 'double vision' | ○ | ○ | X |
| Sharpness and vividness | ○ | ○ | Δ |
| Surface roughness | Ra = 0.005 µm or less Rz = 0.01 µm or less | — — | Ra = 0.08 to 0.15 µm Rz = 0.7 to 1.2 µm |

Figures 10A, 10B, 10C:
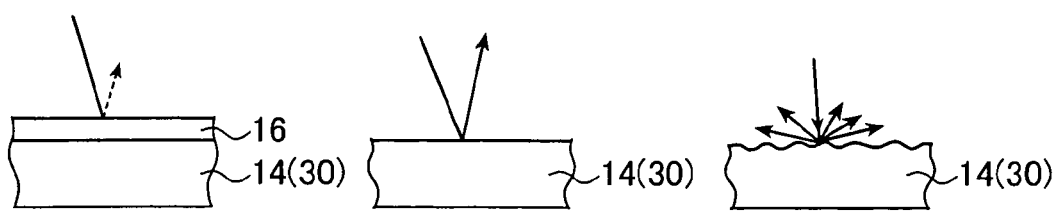
FIGS. 10A, 10B, and 10C are explanatory diagrams for illustrating the surface state of medical displays of Example 2 of the present invention, Comparative Example 2 and Comparative Example 3, respectively, as well as how incident light is reflected by the medical displays.

The results in Table 2 shows that the LCD unit 14 (the polarization plate 30, see FIG. 2) of Comparative example 2, which is an existent medical LCD monitor, has a flat surface and is high in surface reflectivity to reflect incident light as shown in FIG. 10B. Accordingly, the monitor of Comparative Example 2 is regarded well in terms of the color tint, occurrence of whitish color due to peripheral light, glare, the look of 'double vision', and the sharpness and vividness while reflection light of an observer is clearly found on the screen to the point of interfering with observation of a displayed image. As to Comparative Example 3, Table 2 shows that the LCD unit 14 (the polarization plate 30, see FIG. 2) has minute surface irregularities and incident light is irregularly reflected and scattered as shown in FIG. 10C. This obscures reflection light of the observer, making the reflection ignorable. Also, reflected light is not colored but neutral. However, the monitor of Comparative Example 3 has a little whitish appearance caused by peripheral light, glaring and the 'double vision' look are recognized, and the sharpness and vividness of a displayed image is insufficient, thus blurring a displayed image and making interpretation of the image difficult.

In contrast, the surface reflectivity of the AR film 16 adhered to the LCD unit 14 (polarization plate 30) in Example 2 is as low as 0.4% or less, and reflection of incident light is reduced by the AR film 16 as shown in FIG. 10A. This makes reflection light of an observer ignorable. Also, reflected light is not colored but neutral. In addition, the monitor of Example 2 rates well in terms of occurrence of whitish color due to peripheral light, glare, the look of 'double vision', and the sharpness and vividness, which gives the monitor an excellent reflection performance.

In conclusion, the medical LCD monitor of Example 2 is proved to be an excellent medical display which can provide a clear, film-like image that does not make tired an observer interpreting for a long period of time and therefore is suitable for diagnostic or like other uses.

Given above through various embodiments are detailed descriptions on a medical display of the present invention and a medical display system using the same. However, the present invention is not limited to the embodiments described above, and various improvement and modifications can be made without departing from the gist of the present invention.

As described in detail above, according to the present invention, an excellent medical display for diagnostic or other uses can be obtained at low cost which is capable of displaying a clear, film-like, high-quality, diagnostic image that is free from reflection on the display screen and coloring and that does not make tired an observer interpreting for a long period of time by using, in a 100 to 300 ppi high-definition matrix display, a high performance anti-reflection film which is flat or has a given degree of flatness, in other words, which does not have an anti-glare property, and which is successful in achieving lowering of specular reflectivity and reduction of color tint at the same time.

Also, according to the present invention, the luminance of an image displayed on this medical display can be measured accurately, and therefore the gradation can be corrected with precision to, for example, the gradation characteristic of GSDF by DICOM. This makes it possible to provide a medical display system that is capable of stably displaying, as a diagnostic image, on the medical display, a clear, film-like, high-quality image that does not make tired an observer interpreting for a long period of time.

What is claimed is:

1. A medical display, comprising:
    a display device of a matrix type having a resolution of 100 to 300 ppi to display a medical image; and
    at least one anti-reflection layer on a side of a front surface of said display device, wherein
    said anti-reflection layer has an average specular reflectivity of 0.5% or less at an incident angle of 5° in a wavelength range of 450 to 650 nm,
    said anti-reflection layer receives light from a CIE standard light source D65 at an incident angle of 5° in a wavelength range of 380 to 780 nm to reflect the light as regular reflection light whose color falls within a range of $-7 \leq a^* \leq 7$ and $-10 \leq b^* \leq -10$ in terms of a* and b* values of CIE 1976 L*a*b* color space,
    said anti-reflection layer is placed on a surface whose flatness is defined by an arithmetic average height Ra and a maximum height Rz according to JIS B 0601-2001, with Ra set at 0.02 µm or less and Rz set at 0.04 µm or less, and
    said anti-reflection layer does not have an anti-glare property.

2. The medical display according to claim 1, wherein said anti-reflection layer in a form of an anti-reflection film is formed on a support.

3. The medical display according to claim 2, wherein said anti-reflection film is spread over said front surface of the display device.

4. The medical display according to claim 2,
    wherein a protective panel is attached to said front surface of the display device in a manner that puts a distance between said protective panel and said front surface of the display device to avoid contact, and
    wherein one of said anti-reflection film and said anti-reflection layer is placed on each side of said protective panel.

5. The medical display according to claim 1, wherein said anti-reflection layer is provided on said front surface of the display device.

6. The medical display according to claim 1, wherein said anti-reflection layer has such characteristics that the a* value and the b* value fulfill $0 \leq a^* \leq 5$ and $-7 \leq b^* \leq 0$, respectively, and that the average specular reflectivity is 0.3% or less at the incident angle of 5° in the wavelength range of 450 nm to 650 nm.

7. The medical display according to claim 1, wherein a size of a display screen on said front surface of the display device is 18" to 23".

8. The medical display according to claim 1, wherein said display device is a monochrome display device.

9. The medical display according to claim 1, wherein a plane radiographic image obtained by CR (computed radiography) or using a flat panel sensor is displayed at a resolution of 100 to 180 ppi.

10. The medical display according to claim 1, wherein a mammographic image obtained by CR (computed radiography) or using a flat panel sensor is displayed at a resolution of 180 to 300 ppi.

11. A medical display, comprising:
    a display device of a matrix type having a resolution of 100 to 300 ppi to display a medical image; and
    at least one anti-reflection layer on a side of a front surface of said display device, wherein
    said anti-reflection layer has an average specular reflectivity of 0.5% or less at an incident angle of 50° in a wavelength range of 450 to 650 nm,
    said anti-reflection layer receives light from a CIE standard light source D65 at an incident angle of 5° in a wavelength range of 380 to 780 nm to reflect the light as regular reflection light whose color falls within a range of $-7 \leq a^* \leq 7$ and $-10 \leq b^* \leq 10$ in terms of a* and b* values of CIE 1976 L*a*b* color space,
    said anti-reflection layer is placed on a surface whose flatness is defined by an arithmetic average height Ra and a maximum height Rz according to JIS B 0601-2001, with Ra set at 0.02 µm or less and Rz set at 0.04 µm or less, and said anti-reflection layer in a form of an anti-reflection film is formed on a support, wherein said anti-reflection film has a transparent support having a refractive index of nB, a hard coat layer having a refractive index of nH and being placed on the transparent support, and the anti-reflection layer being placed on the hard coat layer, wherein said anti-reflection layer practically has three sub-layers of different refractive indexes, with an intermediate refractive sub-layer being closest to said transparent support and having a refractive index of n1, a high refractive sub-layer following said intermediate refractive sub-layer and having a refractive index of n2, and a low refractive sub-layer being farthest to said transparent support and having a refractive index of n3, wherein the refractive indexes of said three sub-layers satisfy the following relations, $$n3 < nB, nH < n1 < n2$$

wherein, at a design wavelength λ (500 nm), said intermediate refractive sub-layer, said high refractive sub-layer, and said low refractive sub-layer satisfy the following expressions (I), (II), and (III), respectively, $$\lambda/4 \times 0.80 < n1 \times d1 < \lambda/4 \times 1.00 \quad (I)$$

$$\lambda/2 \times 0.75 < n2 \times d2 < \lambda/2 \times 0.95 \quad (II)$$

$$\lambda/4 \times 0.95 < n3 \times d3 < \lambda/4 \times 1.05 \quad (III)$$

(where d1 represents a thickness (nm) of the intermediate refractive sub-layer, d2 represents a thickness (nm) of the high refractive sub-layer, and d3 represents a thickness (nm) of the low refractive sub-layer.)

12. A medical display system, comprising:

a medical display displaying a medical image; and a luminance meter measuring luminance, wherein said medical display, comprising:

a display device of a matrix type having a resolution of 100 to 300 ppi; and at least one anti-reflection layer on a side of a front surface of said display device, wherein said anti-reflection layer has an average specular reflectivity of 0.5% or less at an incident angle of 5° in a wavelength range of 450 to 650 nm, said anti-reflection layer receives light from a CIE standard light source D65 at an incident angle of 5° in a wavelength range of 380 to 780 nm to reflect the light as regular reflection light whose color falls within a range of $-7 \leq a^* \leq 7$ and $-10 \leq b^* \leq 10$ in terms of a* and b* values of CIE 1976 L*a*b* color space, and said anti-reflection layer is placed on a surface whose flatness is defined by an arithmetic average height Ra and a maximum height Rz according to JIS B 0601-2001, with Ra set at 0.02 μm or less and Rz set at 0.04 μm or less, and wherein said medical display system has a function of measuring surface reflection luminance when a power is turned off and display luminance when the power is turned on with said luminance meter, a function of judging measurement data and displaying judgment results, a function of saving the measurement data and the judgment results, and a function of correcting gradation based on the measurement data.

13. The medical display system according to claim 12, wherein said luminance meter is connected online and has a function of measuring the luminance in sync with display of a luminance measurement test pattern on a display screen of said display device.

* * * * *